United States Patent
Lee

(10) Patent No.: US 11,521,593 B2
(45) Date of Patent: Dec. 6, 2022

(54) METHOD OF EMBODYING ONLINE MEDIA SERVICE HAVING MULTIPLE VOICE SYSTEMS

(71) Applicant: Jong Yup Lee, Seoul (KR)

(72) Inventor: Jong Yup Lee, Seoul (KR)

( * ) Notice: Subject to any disclaimer, the term of this patent is extended or adjusted under 35 U.S.C. 154(b) by 119 days.

(21) Appl. No.: 17/076,121

(22) Filed: Oct. 21, 2020

(65) Prior Publication Data

US 2021/0082393 A1   Mar. 18, 2021

Related U.S. Application Data

(63) Continuation of application No. PCT/KR2020/006592, filed on May 20, 2020.

(30) Foreign Application Priority Data

Sep. 18, 2019   (KR) .................. 10-2019-0115017

(51) Int. Cl.
    *G10L 13/08*       (2013.01)
    *G10L 13/00*       (2006.01)
    (Continued)

(52) U.S. Cl.
    CPC .......... *G10L 13/033* (2013.01); *G06F 16/438* (2019.01); *G06F 16/45* (2019.01);
    (Continued)

(58) Field of Classification Search
    CPC .............................. G10L 13/00; G10L 13/02
    See application file for complete search history.

(56) References Cited

U.S. PATENT DOCUMENTS

2010/0318362 A1\* 12/2010 Kurzweil ............... G09B 5/062
                                                            704/260
2012/0265533 A1\* 10/2012 Honeycutt ............. G10L 13/00
                                                            704/260

(Continued)

FOREIGN PATENT DOCUMENTS

JP    2016051407    4/2016
KR    20100071765   6/2010
(Continued)

OTHER PUBLICATIONS

NaturalReader, online "www.naturalreaders.com", archived on www.archive.org, on Dec. 24, 2018. (Year: 2018).\*

(Continued)

*Primary Examiner* — Jialong He
(74) *Attorney, Agent, or Firm* — Cantor Colburn LLP

(57) ABSTRACT

A method of embodying an online media service having a multiple voice system includes a first operation of collecting preset online articles and content from a specific media site and displaying the online articles and content on a screen of a personal terminal, a second operation of inputting a voice of a subscriber or setting a voice of a specific person among voices that are pre-stored in a database, a third operation of recognizing and classifying the online articles and content, a fourth operation of converting the classified online articles and content into speech, and a fifth operation of outputting the online articles and content using the voice of the subscriber or the specific person, which is set in the second operation.

8 Claims, 8 Drawing Sheets

(51) Int. Cl.

| | |
|---|---|
| *G10L 13/033* | (2013.01) |
| *G06F 16/45* | (2019.01) |
| *G06F 16/438* | (2019.01) |
| *G10L 15/183* | (2013.01) |
| *G06Q 30/06* | (2012.01) |
| *G10L 13/047* | (2013.01) |
| *G10L 15/22* | (2006.01) |
| *G06F 16/9535* | (2019.01) |

(52) U.S. Cl.
CPC ..... *G06F 16/9535* (2019.01); *G06Q 30/0613* (2013.01); *G10L 13/047* (2013.01); *G10L 15/183* (2013.01); *G10L 15/22* (2013.01)

(56) References Cited

U.S. PATENT DOCUMENTS

| | | | | |
|---|---|---|---|---|
| 2013/0262118 A1* | 10/2013 | Saeki | ............... | G05B 15/02 704/260 |
| 2014/0122079 A1* | 5/2014 | Kaszczuk | ............... | G10L 13/08 704/260 |
| 2018/0053498 A1* | 2/2018 | Kraft | ............... | G10L 13/10 |
| 2018/0122378 A1 | 5/2018 | Mixter et al. | | |

FOREIGN PATENT DOCUMENTS

| | | |
|---|---|---|
| KR | 20190071794 | 6/2019 |
| KR | 20190085883 | 7/2019 |

OTHER PUBLICATIONS

"Voice Aloud Reader", online "www.hyperionics.com", archived on "www.archive.org" on Feb. 24, 2018. (Year: 2018).*

Hong, KT and Kakao Using Celebrity Voice on AI Speaker, Jun. 4, 2018, Retrieved from the Internet: <URL: http://www.digitaltoday.co.kr/news/articleView.html?idxno=200290>.

International Search Report—PCT/KR2020/006592 dated Sep. 28, 2020.

* cited by examiner

METHOD OF EMBODYING ONLINE MEDIA SERVICE HAVING MULTIPLE VOICE SYSTEMS

BACKGROUND OF THE INVENTION

Field of the Invention

The present disclosure relates to a method of embodying an online media service having a multiple voice system, and more particularly to a method of embodying an online media service having a multiple voice system for performing a series of procedures of reading and viewing online articles using the eyes at various online content platforms including an online newspaper and a search portal, and simultaneously, directly selecting a voice by a subscriber among voices of a plurality of people including the subscriber and listening to the corresponding articles using the selected voice.

Description of the Related Art

Conventionally, it is common to read an article including only simple text when reading online articles and content from online media such as an online newspaper, a search portal, an online content platform, or the like.

However, as the pattern in which readers subscribe to an article changes to mobile devices from personal computers (PCs) due to changes in the online media environment, the pattern in which readers subscribe to an article has also evolved to viewing an article from reading the same.

In practice, readers of recent online media seek to obtain only required information from among a flood of information.

Thus, the card-news configured to briefly provide only major core issues to readers and to allow them to easily and conveniently check only desired information through mobile devices has become popular.

However, in the case of online subscription to articles and content, a typical text-based article (content) or the card-news does not satisfy every subscription to articles in an online media environment.

In reality, humans mostly use their eyes to consume online articles and content in the current online media environment, and thus are exposed to disorders such as eyesight failure.

In fact, in accordance with the life pattern of busy contemporary people, consuming online articles and content using only the eyes through a mobile device has not been popularized due to temporal, spatial, and environment influences.

In particular, when consuming online articles and content using only the eyes through a mobile device, people who frequently go away on business or travel by driving long distances are exposed to severe environments causative of accidents leading to damage to human life, such as traffic accidents, in addition to the ocular health risk.

When a reader consumes online articles and content using only the eyes through a mobile device, he or she is disadvantageously incapable of doing other activities at the same time.

Accordingly, technology has subsequently been introduced for consumption of online articles and content through conversion of text into speech and reads and transmits content in the form of machine-generated sound.

However, such a conventional technology is merely a technology of converting text into speech using a conversion program and outputting the speech using a preset voice through a speaker, and thus is problematic in that a user is bored when listening to articles from various online content platforms such as online newspapers or search portals, and general interest has not been attracted because there is no system for participation of readers (people).

SUMMARY OF THE INVENTION

Therefore, the present disclosure has been made in view of the above problems, and it is an object of the present disclosure to provide a method of embodying an online media service having a multiple voice system for reading and viewing online articles using the eyes at various online content platforms including an online newspaper and a search portal, and simultaneously, directly selecting a voice by a subscriber among voices of a plurality of people including the subscriber and listening to the corresponding articles using the selected voice.

The technical problems solved by the embodiments are not limited to the above technical problems and other technical problems which are not described herein will become apparent to those skilled in the art from the following description.

In accordance with an aspect of the present disclosure, the above and other objects can be accomplished by the provision of a method of embodying an online media service having a multiple voice system, the method including a first operation of collecting preset online articles and content from a specific media site and displaying the online articles and content on a screen of a personal terminal, a second operation of inputting a voice of a subscriber or setting a voice of a specific person among voices that are pre-stored in a database, a third operation of recognizing and classifying the online articles and content, a fourth operation of converting the classified online articles and content into speech, and a fifth operation of outputting the online articles and content using the voice of the subscriber or the specific person, which is set in the second operation.

The second operation may include pre-storing the voice of the specific person in an online store for each field and purchasing the voice of the specific person according to selection of the subscriber.

The second operation may include directly registering and selling the voice of the subscriber in the online store, and the subscriber may include an individual subscriber or a third party whose voice is approved to be used by the subscriber.

The fifth operation may include selecting one or more of the online articles and content for all online articles and content, or for each section, keyword, article, news agency, latest news article, date, view count, degree of association, or headline, and outputting the one or more of the online articles and content using a preset voice.

The method may further include, in consideration of a condition of the online articles and content classified in the fourth operation, setting a specific background sound among pre-stored background sounds and outputting the background sound together with the voice.

The method may further include, in consideration of a condition of the online articles and content classified in the fourth operation, setting a specific intonation style among pre-stored intonation styles and outputting a voice.

The fifth operation may include selecting one or more of the online articles and content for all online articles and content, or for each section, keyword, article, news agency, latest news article, date, view count, degree of association, or headline, and outputting the one or more of the online articles and content using a voice selected by a user.

Various online content platforms (including a webpage or an application) including a common online newspaper and search portal may use the first to fifth operations.

A voice of the individual subscriber or the third party whose voice is approved to be used by the subscriber may be converted into a language of a country selected by the subscriber and the voice may be capable of being input and output.

While being output, a voice that is preset and registered in a store may be converted into a language of a country selected by a user and is capable of being output.

The fifth operation may include selecting and adjusting a speed of an output voice by a user while the voice is output.

The fifth operation may include selecting and adjusting a volume of an output voice by a user while the voice is output.

Various online content platforms (including a webpage or an application) including a common online newspaper and search portal may have a voice recognition button installed therein for selecting the online articles and content, executing or stopping voice output, or executing a change command using a voice in the first to fifth operations.

Other features and more detailed information of the present disclosure are included in the detailed description and the drawings.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

The present disclosure may have various modifications and various embodiments and thus a specific embodiment will be described in more detail with reference to the detailed description and the drawings. In the description of the present disclosure, certain detailed explanations of the related art will be omitted when it is deemed that they may unnecessarily obscure the essence of the present disclosure.

Reference will now be made in detail to embodiments, examples of which are illustrated in the accompanying drawings.

Figure 1:
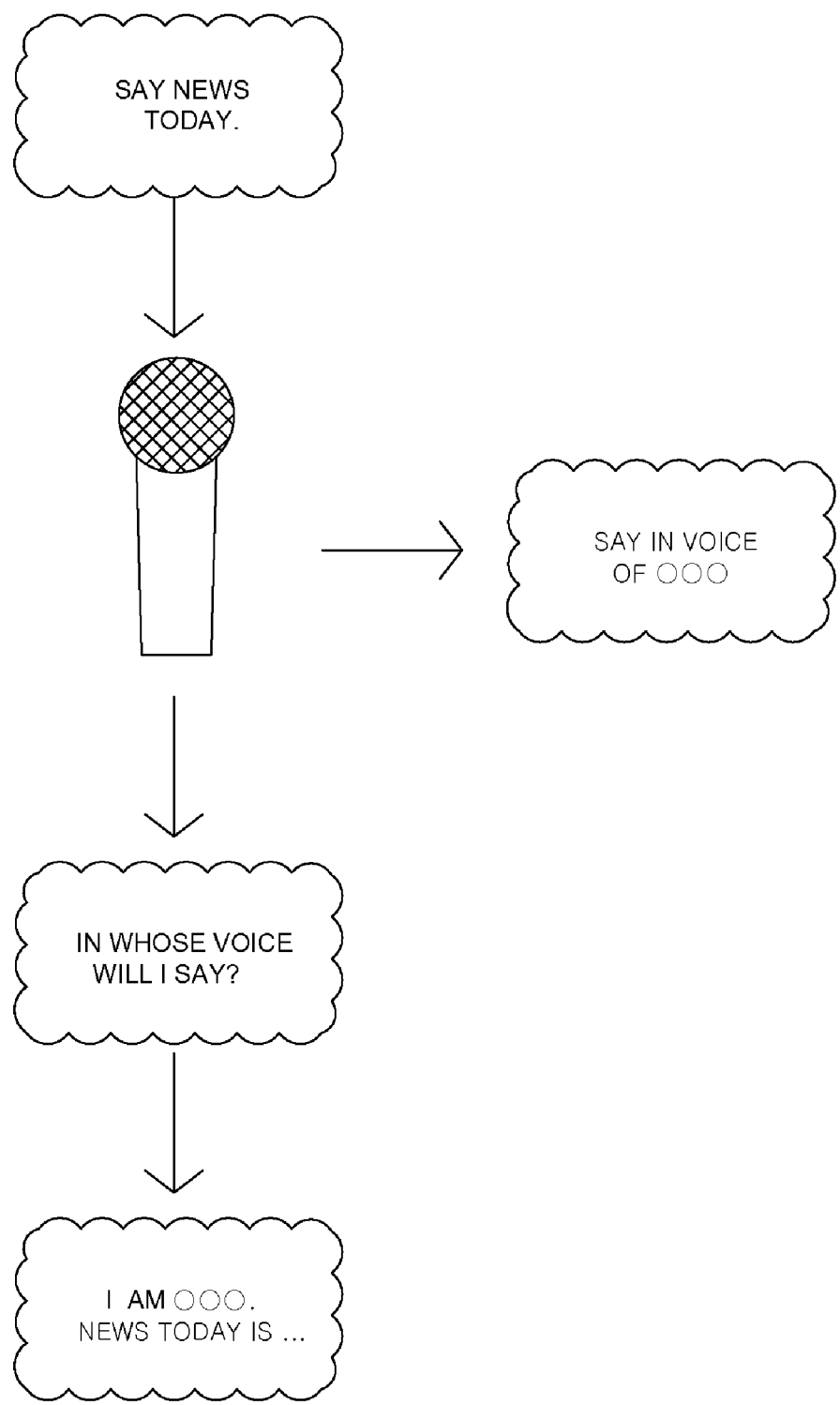
FIG. 1 is a diagram showing multiple voice recognition according to the present disclosure.
Figure 2:
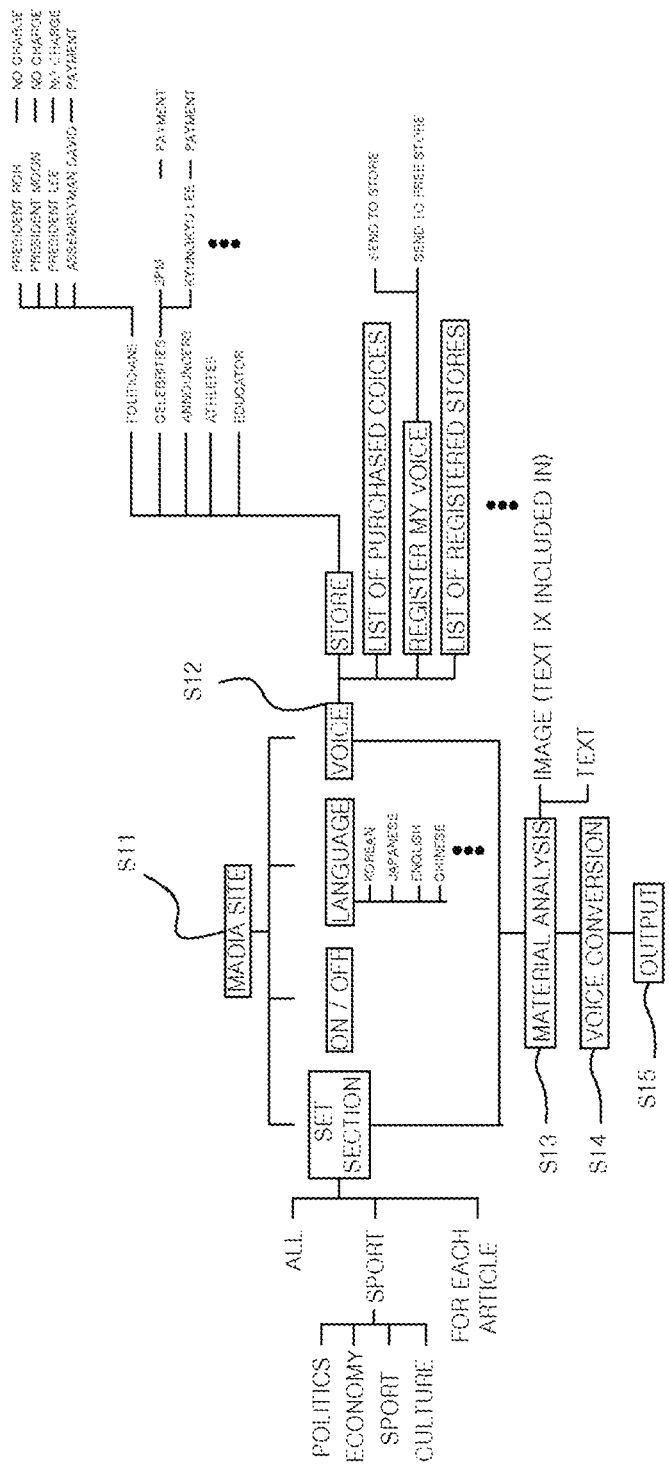
FIG. 2 is a control flowchart showing a method of embodying an online media service having a multiple voice system according to an embodiment of the present disclosure.

FIGS. 1 and 2 are control flowcharts of a method of embodying an online media service having a multiple voice system according to an embodiment of the present disclosure.

As shown in the drawings, the method of embodying an online media service having a multiple voice system according to the present disclosure may include a first operation of collecting preset online articles and content from a specific media site and displaying the online articles and content on a screen of a personal terminal (S11), a second operation of inputting a voice of a subscriber or setting a voice of a specific person among voices that are pre-stored in a database (S12), a third operation of recognizing and classifying the online articles and content (S13), a fourth operation of converting the classified online articles and content into speech (S14), and a fifth operation of outputting the online articles and content using the voice of the subscriber or the specific person, which is set in the second operation (S15).

In the first operation S11, the preset online articles and content may be collected from a specific media site and may be displayed on a screen of a personal terminal.

In this case, the online articles and content may be classified and set for each article and for each section, for example, politics, economy, sport, or culture. In addition, languages of respective countries, such as Korean, English, Japanese, or Chinese, may be selected.

In the second operation S12, the voice of the subscriber may be directly registered and sold through an online store, and the subscriber may include an individual subscriber or a third party whose voice is approved to be used by the subscriber.

Thus, in the second operation S12, the voice of the individual subscriber or the third party whose voice is approved to be used by the subscriber may be input, or the voice of a specific person among the voices pre-stored in a database may be set.

The store may include a list of purchased voices, which is classified into politicians, celebrities, announcers, or athletes, and the subscriber's own voice may be directly registered in the store.

In the third operation S13, the online articles and content may be recognized and classified.

In this case, an image or text region may be extracted from a key frame extracted using a common artificial intelligence technology, a title of an article (content) may be acquired and stored for each article (content) of news and content through characteristic recognition from the extracted region, and the news and the content may be classified for each title or content.

In more detail, the news may also be classified for all online articles and content, or for each section, keyword, article, news agency, latest news article, date, view count, degree of association, or headline using the artificial intelligence technology.

In the fourth operation S14, the classified online articles and content may be converted into speech, and in the fifth operation S15, the online articles and content may be output using the voice of the subscriber or the specific person, which is set in the second operation.

In the fifth operation, one or more of the online articles and content may be selected for all online articles and content, or for each section, keyword, article, news agency, latest news article, date, view count, degree of association, or headline, and may be output using the preset voice.

Figure 3:
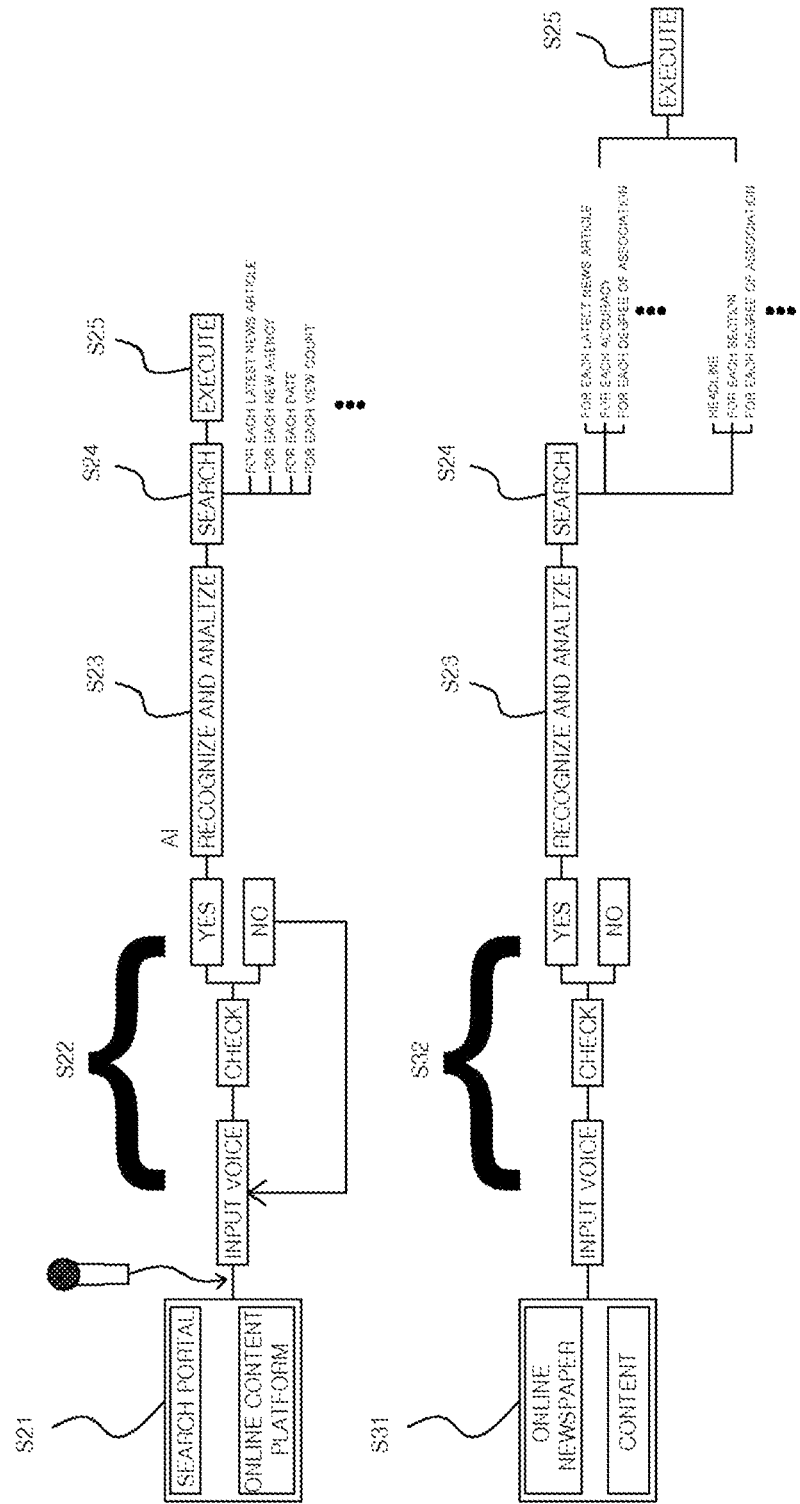
FIG. 3 is a flowchart showing the case in which online articles and content of various online content platforms such as a search portal or an online newspaper are embodied using a voice according to an embodiment of the present disclosure.

FIG. 3 is a flowchart showing the case in which online articles and content of various online content platforms such as a search portal or an online newspaper are embodied using a voice according to an embodiment of the present disclosure.

As shown in the drawing, a preset online articles and content may be collected from a specific search portal (S21), the voice of an individual subscriber or a third party whose voice is approved to be used by the subscriber or the voice of a specific person, purchased at an online store, may be set (S22), the online articles and content may be recognized and classified (S23), the classified online articles and content may be converted into speech and then an output order thereof may be searched for (S24), and then, the online articles and content may be output using the voice of the subscriber or the specific person, which is set in the above operation (S25).

In another example, as shown in the drawing, a preset online articles and content may be collected from a specific online newspaper (S31), the voice of an individual subscriber or a third party whose voice is approved to be used by the subscriber may be set, or the voice of a specific person, purchased at an online store, may be set (S32), the online articles and content may be recognized and classified (S33), the classified online articles and content may be converted into speech and then an output order thereof may be searched for (S34), and then the online articles and content may be output using the voice of the subscriber or the specific person, which is set in the above operation (S35).

Figure 4:
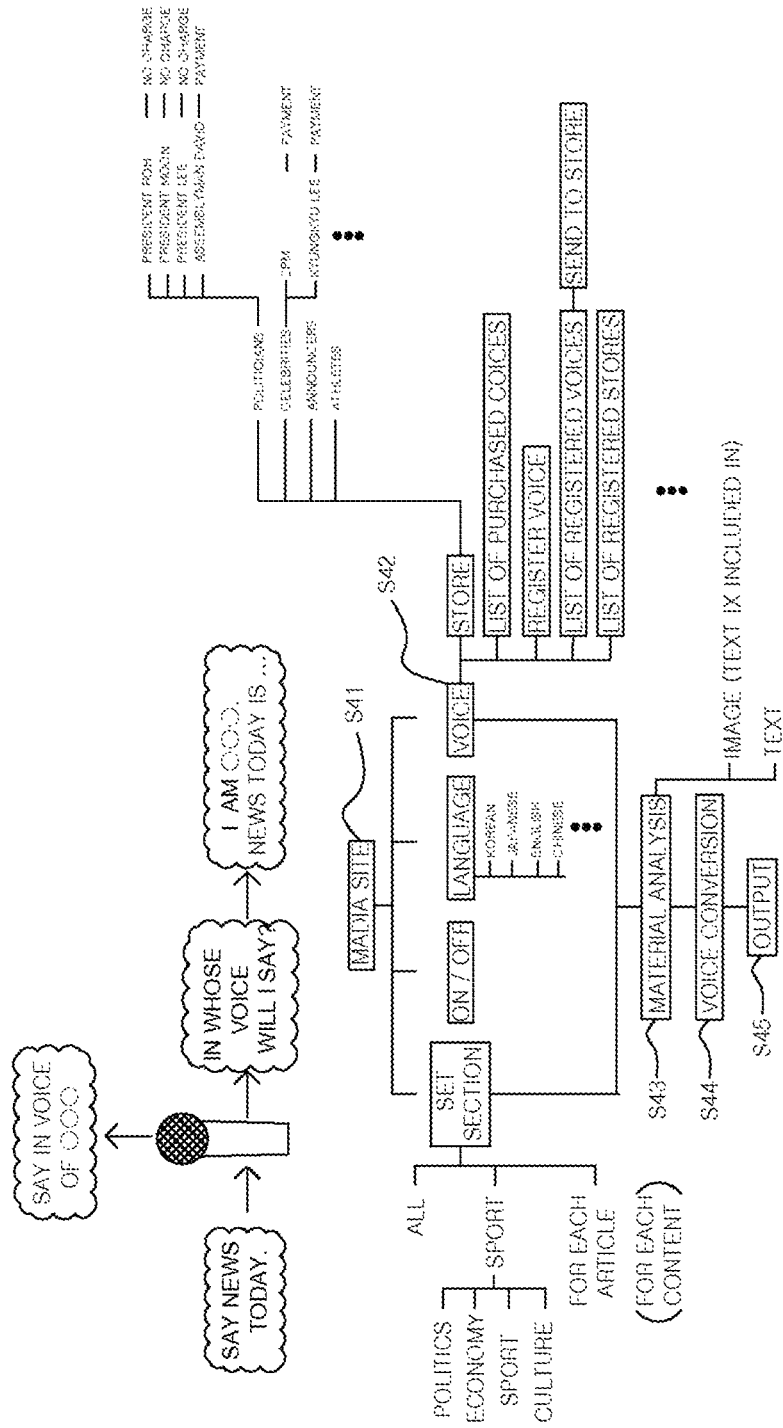
FIG. 4 is a control flowchart showing another embodiment of FIG. 2.

FIG. 4 is a control flowchart showing another embodiment of FIG. 2.

As shown in the drawing, the method of embodying an online media service having a multiple voice system according to the present disclosure may include a first operation of collecting preset online articles and content from a specific media site and displaying the online articles and content on a screen of a personal terminal (S41), a second operation of inputting the voice of an individual subscriber or a third party whose voice is approved to be used by the subscriber or setting the voice of a specific person among the voices pre-stored in a database (S42), a third operation of recognizing and classifying the online articles and content (S43), a fourth operation of converting the classified online articles and content into speech (S44), a fifth operation of outputting the online articles and content using the voice of the subscriber or the specific person, which is set in the second operation (S45), which is substantially the same as the description given with reference to FIG. 1.

However, the method may further include a function of directly registering and selling the voice of the subscriber or the third party whose voice is approved to be used by the subscriber at the online store when the voice of the individual subscriber or the third party whose voice is approved to be used by the subscriber is input or when the voice of a specific person is set among the voices pre-stored in a database, in the second operation S42.

Figure 5:
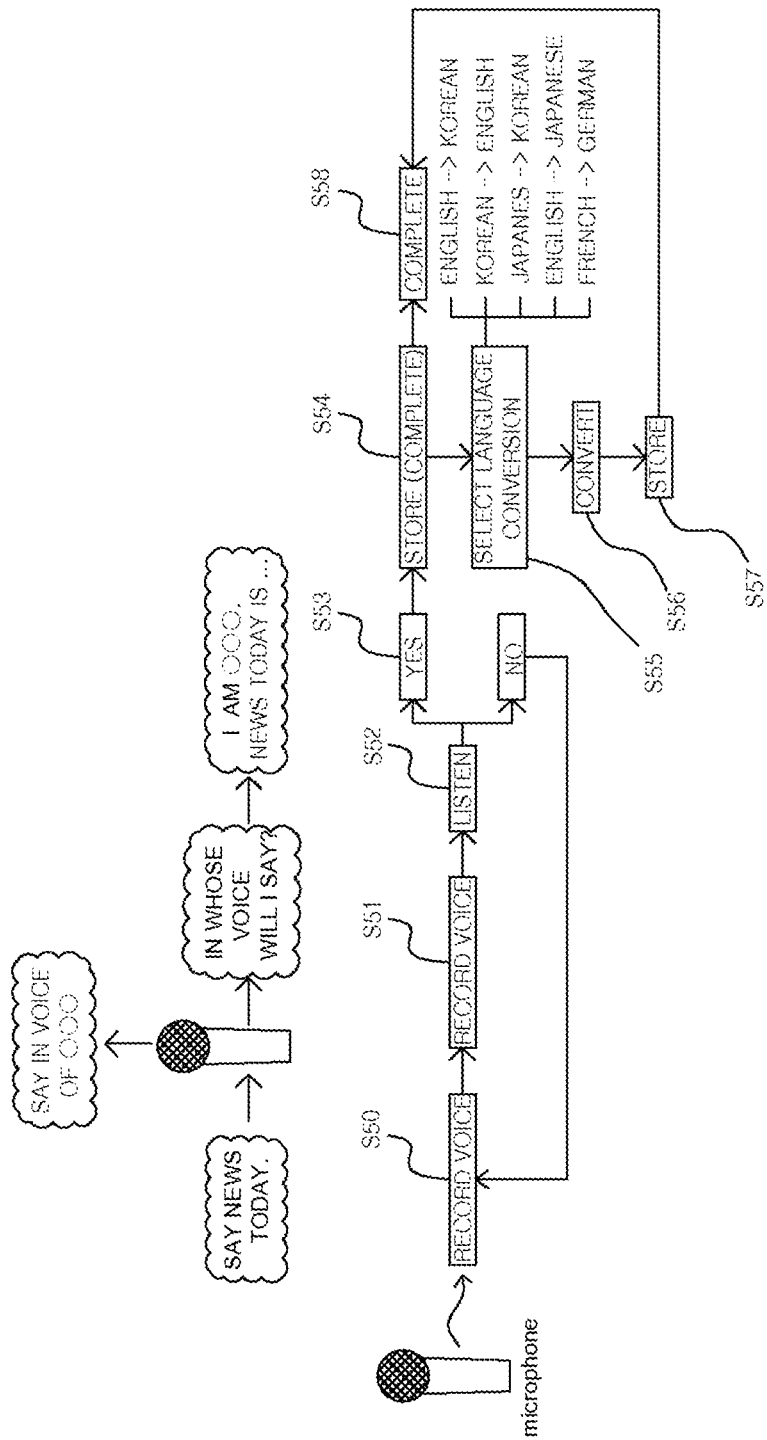
FIG. 5 is a control flowchart showing a procedure of recording and storing a voice of a subscriber according to the present disclosure.

FIG. 5 is a control flowchart showing a procedure of recording and storing the voice of an individual subscriber or a third party whose voice is approved to be used by the subscriber according to the present disclosure.

As shown in the drawing, when a personal voice is input through a microphone (S51) for voice recording (S50), whether or not to store the input voice may be selected by listening to the voice (S52 to S53).

When the voice is selected to be stored, conversion into a specific language among languages such as English, Korean, Japanese, and Chinese may be selected, and conversion and storing operations may be sequentially performed to complete the storing (S54 to S58).

Figure 6:
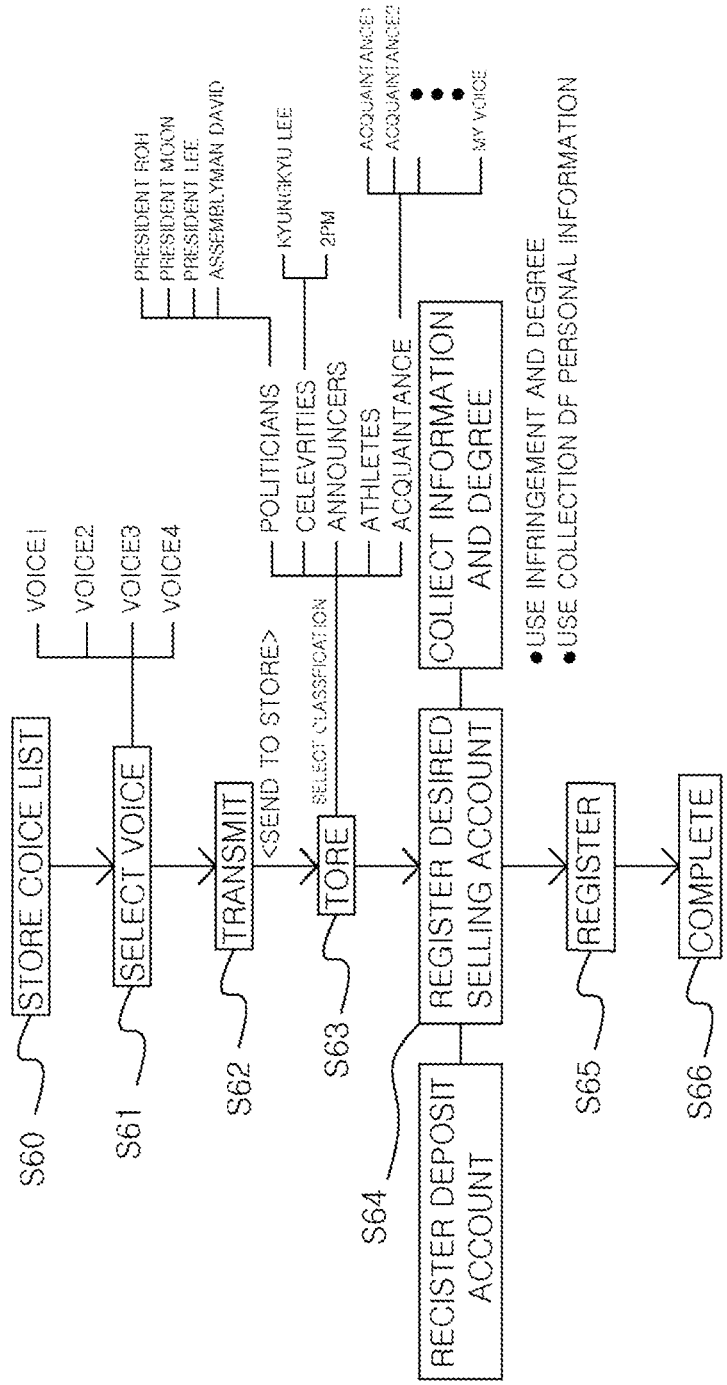
FIG. 6 is a control flowchart showing a procedure of selecting a stored voice and registering and selling the voice in an online store according to the present disclosure.

FIG. 6 is a control flowchart showing a procedure of selecting a stored voice and registering and selling the voice in an online store according to the present disclosure.

As shown in the drawing, the voice of a specific person may be pre-stored in an online store for each field, and may be purchased at the online store according to selection of the subscriber.

For example, when a voice list stored in a database is viewed (S60) and then a specific voice is selected and transmitted to a store (S61 to 62), a voice for each classification of a specific person, for example, a politician, a celebrity, an announcer, or an athlete may be displayed at the store (S63), and a desired selling price of the voice of the subscriber may be registered, and selling of the voice of the subscriber may be registered in the store (S64 to S66).

Figure 7:
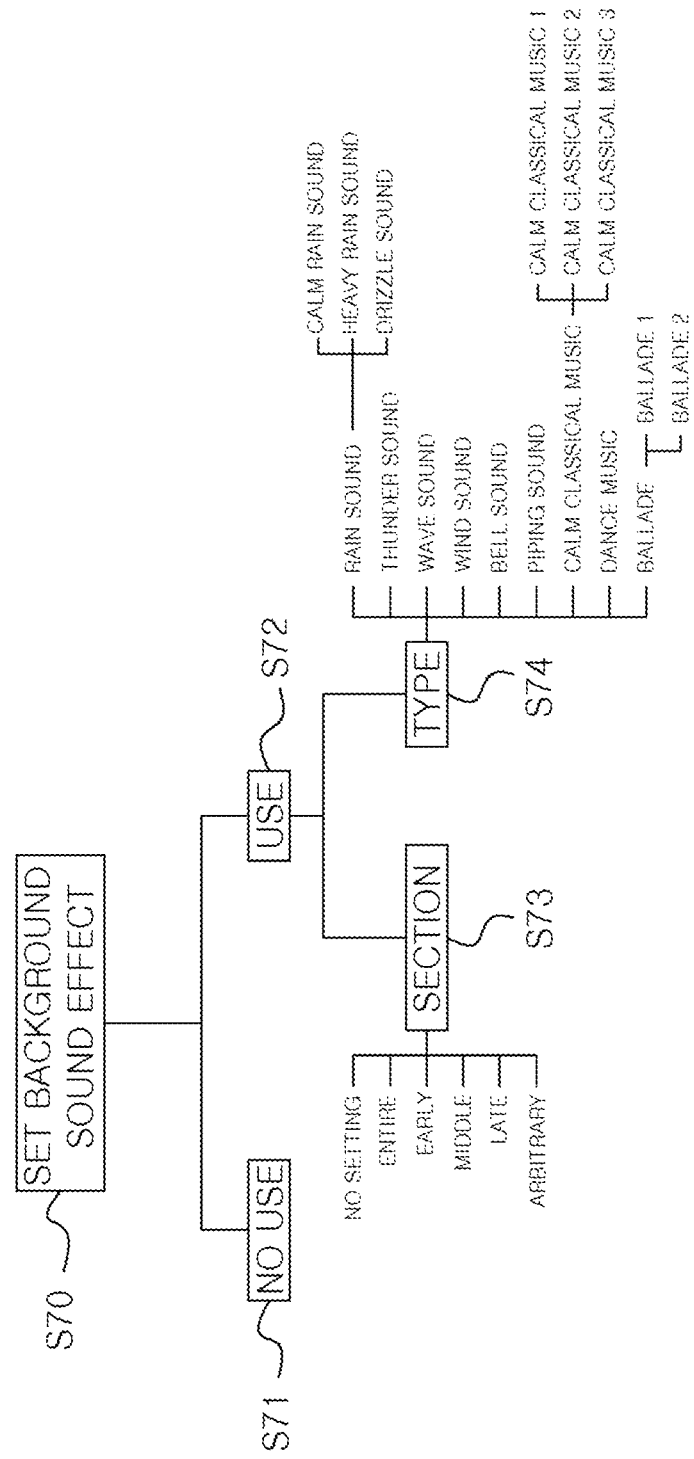
FIG. 7 is a control flowchart showing a procedure of setting a background sound according to the present disclosure.

FIG. 7 is a control flowchart showing a procedure of setting a background sound according to the present disclosure.

In consideration of a condition of the online articles and content classified in the fourth operation according to the present disclosure, a specific background sound may be set among pre-stored background sounds, and may be output together with the voice.

In this case, as shown in the drawing, when the background sound is set (S70), a subscriber may select whether to use the background sound (S71 to S72), sections (e.g., an entire portion, an early portion, a middle portion, a late portion, or an arbitrary portion) may be set, and the background sound may be output for each type (e.g., rain sound, thunder sound, wave sound, wind sound, bell sound, or piping sound) (S73 to S74).

Figure 8:
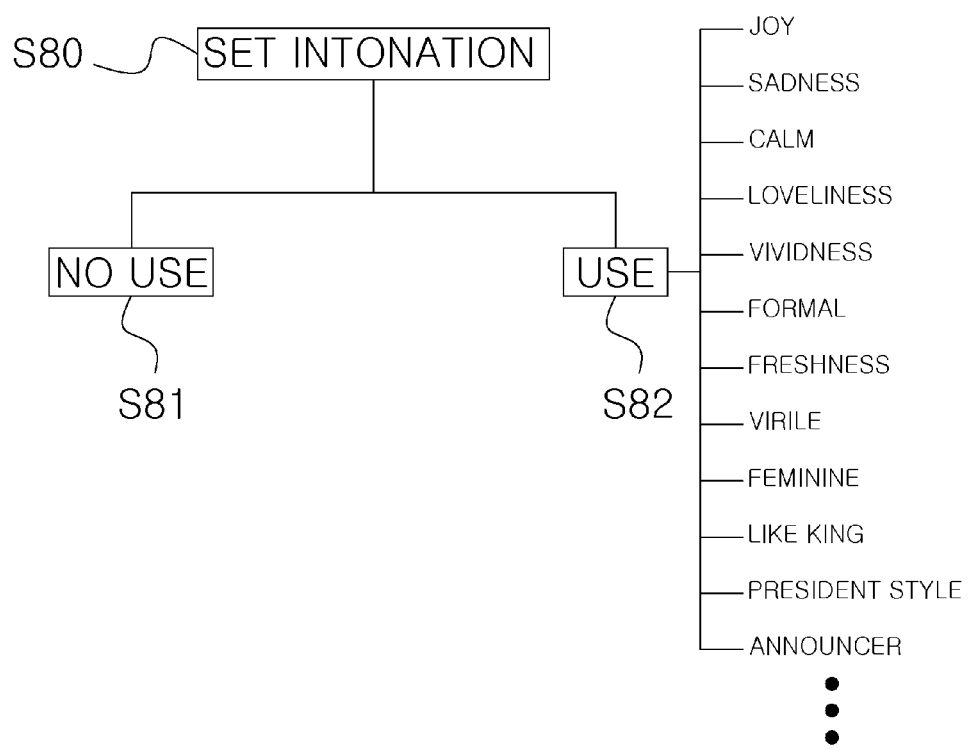
FIG. 8 is a control flowchart showing a procedure of setting a voice for each style according to the present disclosure.

FIG. 8 is a control flowchart showing a procedure of setting a voice for each style according to the present disclosure.

In consideration of a condition of the online articles and content classified in the fourth operation according to the present disclosure, a specific intonation style may be set among pre-stored intonation styles and a voice of the corresponding style may be output.

In this case, as shown in the drawing, when the style is set (S80), a subscriber may select whether to use the intonation style (S81 to S82), joy, sadness, calm, loveliness, vividness, or freshness as example of intonation styles for respective types may be selectively used.

According to the present disclosure, various online content platforms (which include a webpage or an application) including a common online newspaper and search portal may use the method of the first to fifth operations installed therein.

The voice of an individual subscriber or a third party whose voice is approved to be used by the subscriber may be converted into a language of a country selected by the subscriber and then the converted voice may be input and output.

In this case, the procedure of converting the voice into the language of the country selected by the subscriber may use a common voice conversion system.

When a voice registered in a preset store is output, the voice may be converted into a language of a country selected by a user and may be output using the voice conversion system.

When the voice is output in the fifth operation, the user may selectively adjust the speed of the output voice.

In this case, when the online articles and content are converted into speech and are output, the subscriber may set the speed of the output voice to, for example, very fast, fast, middle, slow, and very slow.

A voice speed adjustment menu may be provided to permit a user to arbitrarily and directly adjust a voice speed, and thus the user may arbitrarily set the voice speed within a speed adjustment range between 0 and 100, and may select the speed adjustment through the corresponding menu.

When the voice is output in the fifth operation, the user may selectively adjust the volume of the output voice.

In this case, when the online articles and content are converted into speech and are output, the subscriber may set the volume of the output voice to, for example, very high, high, middle, low, and very low.

A voice volume adjustment menu may be provided to permit a user to arbitrarily and directly adjust a voice volume, and thus the user may arbitrarily set the voice volume within a volume adjustment range between 0 and 100, and may select the volume adjustment through the corresponding menu.

In the first to fifth operations, various online content platforms (which include a webpage or an application) including a common online newspaper and search portal may have a voice recognition button installed therein so as to issue a command for selecting the online articles and content and a command for executing, stopping, or changing voice output.

That is, a user (a subscriber) may execute all commands through a voice execution button on a screen of a mobile device while using the corresponding service.

For example, when articles and content are searched for, searching for a news agency, searching for a headline article and content, searching for articles and content based on a keyword, searching for the latest articles and content, searching for articles and content having a high view count, searching particular classifications and sections, searching particular dates, and searching based on a degree of association may be indicated through the corresponding voice recognition button, and all commands of the user (subscriber) for stoppage and execution of the corresponding command and stoppage of service usage may be executed through a voice execution button device.

The method of embodying an online media service having a multiple voice system according to the present disclosure as configured above may overcome the problem with the conventional technology, and may improve convenience of activities of smoothly subscribing to online media in various daily lives of contemporary people without temporal, spatial, and environmental influences.

In addition, a subscriber may listen to specific articles and content using the voice of the subscriber or the voice of a third party whose voice is approved to be used by the subscriber when subscribing to articles and content in an online media site (an online newspaper, a search portal, or various online content platforms) by recording the subscriber's own voice or the voice of the third party whose voice is approved to be used by the subscriber and may also listen to the articles and content according to the subscriber's own preference by providing a voice storage system for storing voices of people in various preset fields and permitting a reader to select a specific voice.

The subscriber's own voice or the voice of the third party whose voice is approved to be used by the subscriber may be directly sold through a voice store, and voices of specific people may also be advantageously selected and sold by a subscriber (user).

In addition, a user may directly select a desired language, may listen to specific articles and content using the selected language, and may advantageously listen to articles and content, provided from various online content platforms including an online newspaper and a portal and selected by the user for all online articles and content, or for each section, keyword, article, news agency, latest news article, date, view count, degree of association, or headline using the voice selected by the user.

It will be appreciated by persons skilled in the art that that the effects that could be achieved with the present disclosure are not limited to what has been particularly described hereinabove and other advantages of the present disclosure will be more clearly understood from the detailed description.

Embodiments described in the specification and components shown in the drawings are a merely exemplary embodiment of the present disclosure and do not represent all technological features of the present disclosure, and thus, it is to be appreciated that various equivalents and modifications can be made to substitute the features when the application is filed. Accordingly, it will be understood by those of ordinary skill in the art that the present disclosure is not limited to the aforementioned embodiments and various changes in form and details are made therein without departing from the spirit and scope of the present disclosure as defined by the following claims and are within the scope of the claims.

What is claimed is:

1. A method of embodying an online media service having a multiple voice system, the method comprising:
    a first operation of collecting preset online articles and content from a specific media site and displaying the online articles and content on a screen of a personal terminal;
    a second operation of inputting a voice of a subscriber or setting a voice of a specific person among voices that are pre-stored in a database, wherein the subscriber includes an individual subscriber or a third party whose voice is approved to be used by the subscriber, and the voice is converted into a language of a selected country and is capable of being input and output;
    a third operation of recognizing and classifying the online articles and content;
    a fourth operation of converting the classified online articles and content into speech; and
    a fifth operation of outputting the speech obtained in the fourth operation using the voice of the subscriber or the specific person, which is set in the second operation;
    wherein the second operation further comprises: pre-storing the voice of the specific person in an online store for each field; purchasing the voice of the specific person according to selection of the subscriber; and directly registering and selling the voice of the subscriber in the online store; and
    wherein the fifth operation further comprises: selecting one or more of the online articles and content for all online articles and content; selecting different types of background sounds according to different sections of the online articles and content; and outputting the selected one or more of the online articles and content using the voice of the subscriber together with the selected different types of background sounds.

2. The method of claim 1, further comprising: in consideration of a condition of the classified online articles and content in the fourth operation, setting a specific intonation style among pre-stored intonation styles and outputting a voice.

3. The method of claim 1, wherein the preset voice includes: a voice selected by a user.

4. The method of claim 1, wherein various online content platforms comprising a common online newspaper and search portal use the first to fifth operations.

5. The method of claim 1, wherein the voice includes: a voice of the individual subscriber or a voice of the third party.

6. The method of claim 1, wherein the voice is converted into the language of the selected country, while being output.

7. The method of claim 1, wherein the fifth operation comprises: selecting and adjusting a speed of an output voice by a user while the voice is output.

8. The method of claim 1, wherein various online content platforms comprising a common online newspaper and search portal has a voice recognition button installed therein for selecting the online articles and content, executing or stopping voice output, or executing a change command using a voice in the first to fifth operations.

\* \* \* \* \*